United States Patent
Chigira et al.

[11] Patent Number: 5,845,561
[45] Date of Patent: Dec. 8, 1998

[54] APPARATUS FOR PREPARING A COFFEE BEVERAGE

[75] Inventors: Noboru Chigira, Saitama; Naoto Fukushima, Gunma; Kazuhiro Uehara, Saitama; Masakazu Sakata; Kouji Takeda, both of Gunma, all of Japan

[73] Assignee: Sanyo Electric Co., Ltd., Osaka-fu, Japan

[21] Appl. No.: 843,526

[22] Filed: Apr. 16, 1997

[30] Foreign Application Priority Data

Apr. 17, 1996 [JP] Japan ..................................... 8-095020

[51] Int. Cl.⁶ ..................................................... A47J 31/40
[52] U.S. Cl. ........................................... 99/286; 99/289 R
[58] Field of Search ................................... 99/286, 289 R, 99/290; 241/155, 157, 159, 235, 236, 161, 163, 78, 79, 79.1

[56] References Cited

U.S. PATENT DOCUMENTS

| 2,045,591 | 6/1936 | Falla | 426/482 |
|---|---|---|---|
| 2,517,073 | 8/1950 | Alvarez | 99/286 X |
| 4,642,906 | 2/1987 | Kaatze et al. | 99/286 X |
| 4,655,400 | 4/1987 | Erb et al. | 241/29 |
| 5,076,157 | 12/1991 | Satake | 99/519 |
| 5,257,574 | 11/1993 | Hiromichi | 99/483 |
| 5,307,733 | 5/1994 | Enomoto | 99/280 |

FOREIGN PATENT DOCUMENTS

| 52595 | 5/1972 | Netherlands . |
|---|---|---|
| 2099721 | 12/1982 | United Kingdom . |

*Primary Examiner*—Reginald L. Alexander
*Attorney, Agent, or Firm*—McDermott, Will & Emery

[57] ABSTRACT

An apparatus for preparing a coffee beverage by supplying the ground coffee beans fed from a coffee mill for grinding coffee beans to an extractor to prepare the coffee beverage is disclosed, wherein a device for removing the silver skins out of the coffee beans ground by the coffee mill is provided therewith.

6 Claims, 10 Drawing Sheets

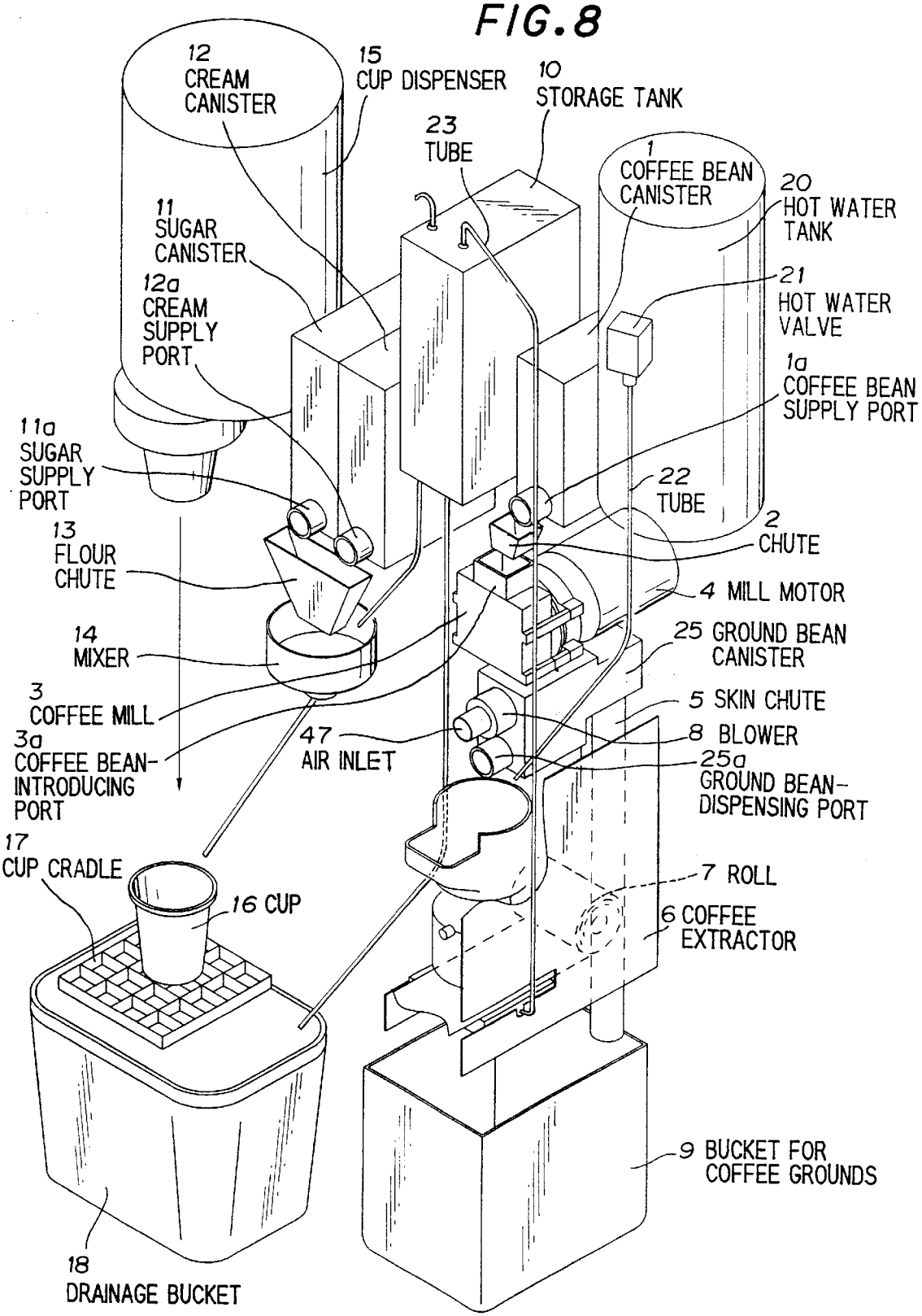

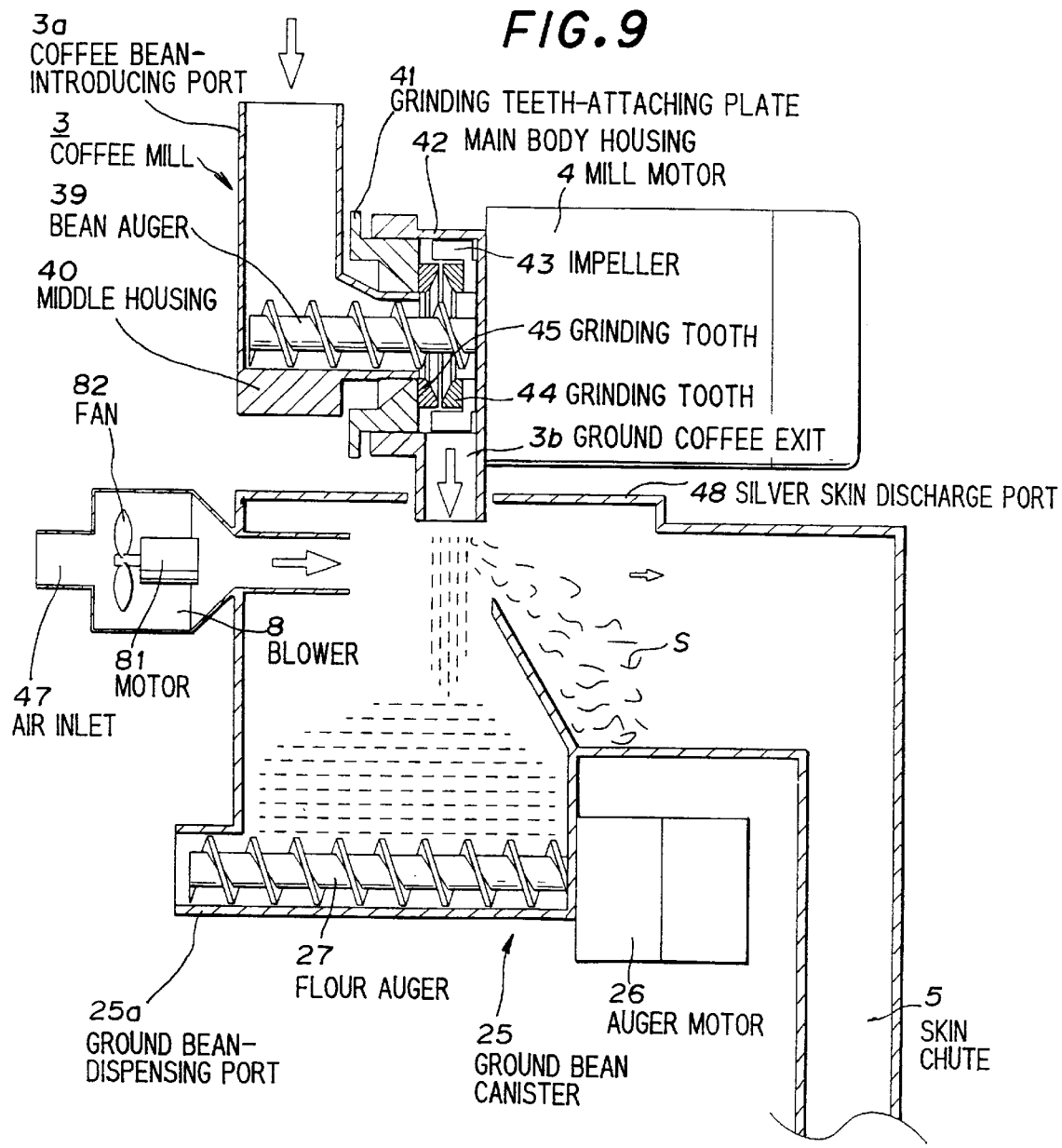

5,845,561

APPARATUS FOR PREPARING A COFFEE BEVERAGE

FIELD OF THE INVENTION

The present invention relates to an apparatus for preparing a coffee beverage, and more particularly to an apparatus for preparing a coffee beverage in which a less astringent and strong coffee beverage can be provided at the low material cost.

BACKGROUND OF THE INVENTION

A conventional apparatus for preparing the coffee beverage supplies the coffee beans from a coffee bean canister to a coffee mill, where they are ground into a required particle size of particles to provide the ground particles to a coffee extractor.

When the coffee particles are supplied to the extractor, the extraction is carried out by hot water supplied from a hot water tank, and the extract is filtered with a paper filter to yield a coffee beverage. This coffee beverage is stored into a storage tank, and on the vending demands, a required amount of coffee beverage is fed into a cup. At this time, it is mixed with sugar and/or cream at need. To the taste of the coffee beverage, it is important to control the astringency for a black coffee beverage having no sugar and cream added. Traditionally, a thick coffee beverage has been considered as a coffee beverage strong in astringency. However, the coffee beverage strong in astringency can not be regarded as a high quality coffee beverage. Conventionally, the control of the astringency has been difficult, so that when a less astringent and thick black coffee has been required, a 15–20 g of coffee beans doubling the normally used amount of 8–10 g has been used, and the time for extraction of coffee beans has been shortened to utilize the delayed elution of the astringency.

On the other hand, the astringency is masked with sugar in a sugar-contained coffee beverage, and thus the control of the astringency is not so much difficult therein. Therefore, even if the 8–10 g of coffee beans were used, a sufficiently thick sugar-contained coffee beverage can be obtained by elongating the extraction time.

Further, the silver skins contain a lot of fibrous materials and when they are ground with a coffee mill, they are finely divided into particulate and tend to become a dust component less than 60–80 mesh passing through a paper filter.

In this manner, when the amount of silver skins is increased, even a sugar and/or cream-contained coffee beverage is accompanied by a miscellaneous taste, thereby lowering the taste of the coffee beverage.

Due to such backgrounds, the conventional apparatus for preparing the coffee beverage controls the astringency thereby enhancing the taste of the black coffee beverage, without realizing on object to remove such a miscellaneous taste, by increasing the amount of used coffee beans and shortening the extraction time thereof.

However, the black coffee beverage prepared by the conventional apparatus for preparing coffee beverages rises the cost of materials because an increased amount coffee beans are used to reduce the extraction time thereof, thereby inhibiting the astringency. Further, the dust component including the silver skins can not be removed and thus, the miscellaneous taste of a black, or a sugar and/or cream-contained coffee beverage can not be removed.

It is therefore an object of the present invention to provide an apparatus for preparing a coffee beverage with no astringency while suppressing an increase in the cost of materials.

It is another object of the present invention to provide an apparatus for preparing a coffee beverage with no miscellaneous taste.

SUMMARY OF THE INVENTION

According to the present invention, an apparatus for preparing a coffee beverage, comprises: a coffee mill for grinding coffee beans to provide ground coffee beans; an extractor for extracting a coffee beverage out of said ground coffee beans; and means for removing silver skins out of said coffee beans when said coffee beans are ground.

The term "coffee beans" in this specification means "roasted coffee beans" unless otherwise noted.

BRIEF DESCRIPTION OF THE DRAWINGS

The invention will be described in detail in conjunction with the appended drawings, wherein:

FIG. 8 is a perspective view showing an apparatus for preparing a coffee beverage in the second preferred embodiment of the present invention;

FIG. 9 is a partially sectional view showing the coffee mill and bean canister in the second preferred embodiment shown in FIG. 8.

DESCRIPTION OF THE PREFERRED EMBODIMENTS

Before describing the apparatus for preparing a coffee beverage in the preferred embodiments according to the present invention, the aforementioned conventional apparatus for preparing a coffee beverage will be explained in FIG. 1 in more detail.

Figure 1:
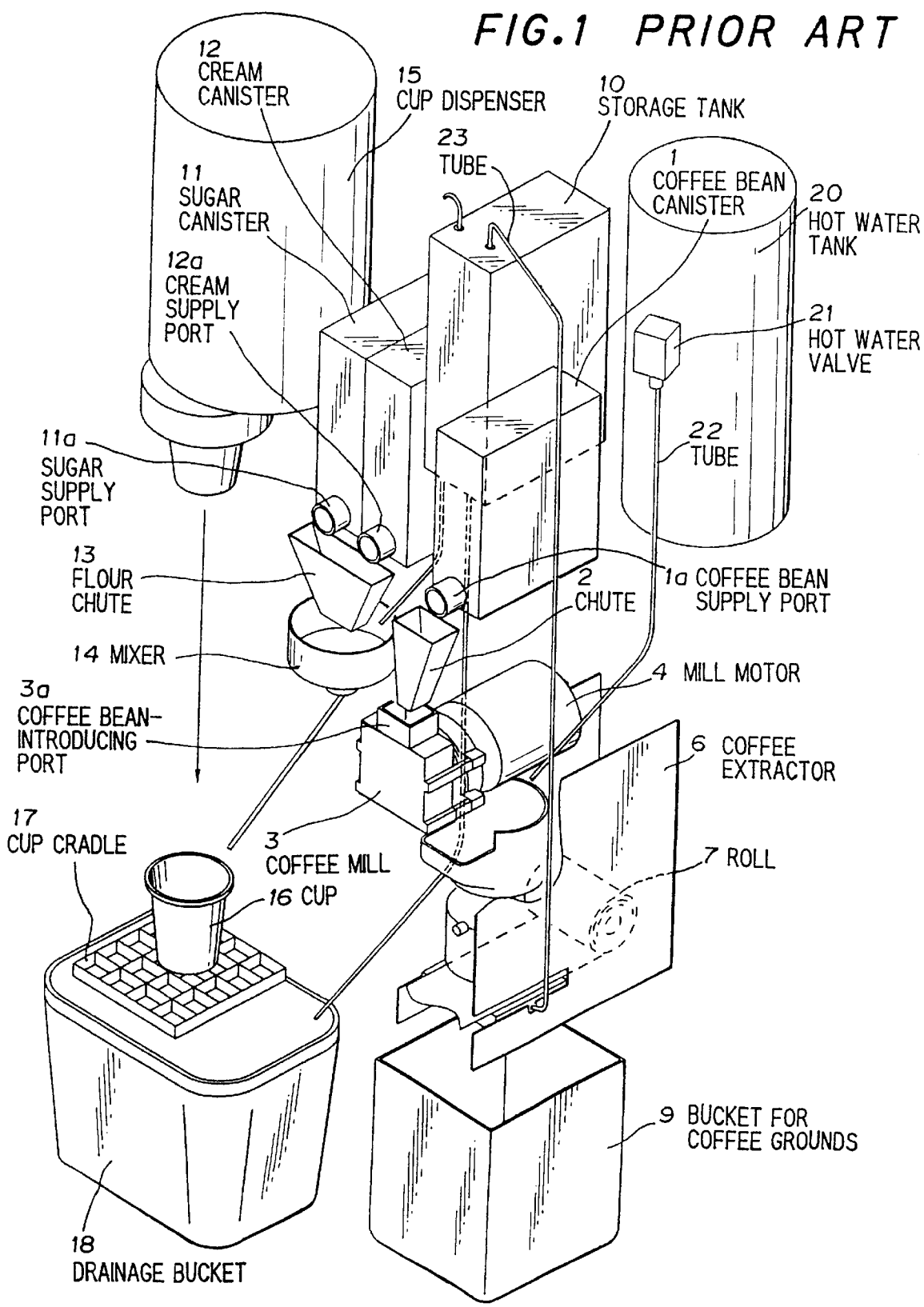
FIG. 1 is a perspective view showing a conventional apparatus for preparing a coffee beverage.

FIG. 1 shows the conventional apparatus for preparing a coffee beverage. This apparatus comprises a coffee bean canister 1 for supplying the roasted coffee beans from a supply port 1a to a chute 2, a coffee mill 3 which receives the coffee beans fed to the chute 2 from a coffee bean-introducing port 3a to grind the coffee beans to a predetermined particle size with rollers, a mill motor 4 to rotate the rollers of the coffee mill 3, a coffee extractor 6 which extracts the roasted ground coffee by hot water supplied from a hot-water valve 21 of a hot-water tank 20 through a tube 22 and filters the extracted coffee beverage by the paper filter supplied from a paper roll 7 to supply the filtered coffee beverage, a bucket 9 for receiving the coffee grounds from the coffee extractor 6 after the extraction, a storage tank 10 for storing the coffee beverage fed from the coffee extractor 6 through a tube 23, a sugar canister 11 for supplying sugar from a supply port 11a, a cream canister 12 for supplying cream from a supply port 12a, a mixer 14 which receives the sugar or cream supplied from the sugar canister 11 or the cream canister 12, respectively, or both of them through a flour chute 13 to mix the sugar, cream or both of them with the coffee beverage fed from the storage tank 10, a cup dispenser 15 for supplying a cup 16 onto a cup cradle 17, and a drainage bucket 18 for receiving the excess coffee beverage in the storage tank 10, or the overflow from the cup 16 and the like.

In operation of the conventional apparatus for preparing coffee beverages described above, on demand for a sugar and cream-contained coffee beverage, a required amount of coffee beverage is supplied into the mixer 14 from the storage tank 10, and simultaneously, a required amount of sugar and cream are supplied into the mixer 14 out of the sugar canister 11 and the cream canister 12, respectively for mixing the coffee beverage with the sugar and cream to provide the sugar and cream-contained coffee beverage.

On the other hand, when the storage tank 10 has no coffee beverage, a required amount (generally, about 8–10 g) of coffee beans are supplied to the coffee bean-introducing port or inlet 3a of the coffee mill 3 from the supply port 1a of the coffee bean canister 1 through the chute 2. The rotation of the mill motor 4 is started on the demand of the coffee.

Figure 2:
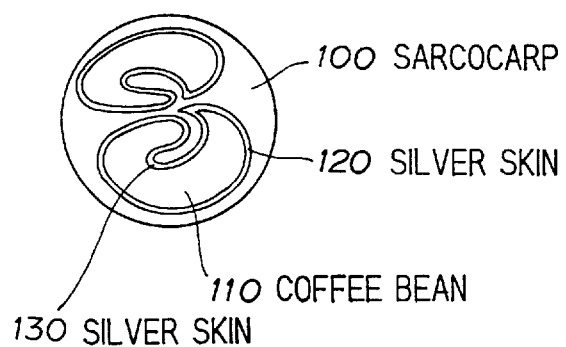
FIG. 2 is a sectional view showing a coffee bean.

FIG. 2 shows a coffee bean 110 wrapped with the sarcocarp 100. The coffee bean 110 is coated with a silver skin or astringent coat 120 and a part 130 of the silver skin 120 is rolled into the inside of the coffee bean 110. The silver skin 120 of this portion can not be removed except for taking it out of the sarcocarp 100 by grinding the coffee beans 110. When the silver skin 120 is contained in the coffee beverage, it will present the undesirable astringency as the taste.

Next, an apparatus for preparing a coffee beverage in the preferred embodiments according to the present invention will be explained.

Figure 3:
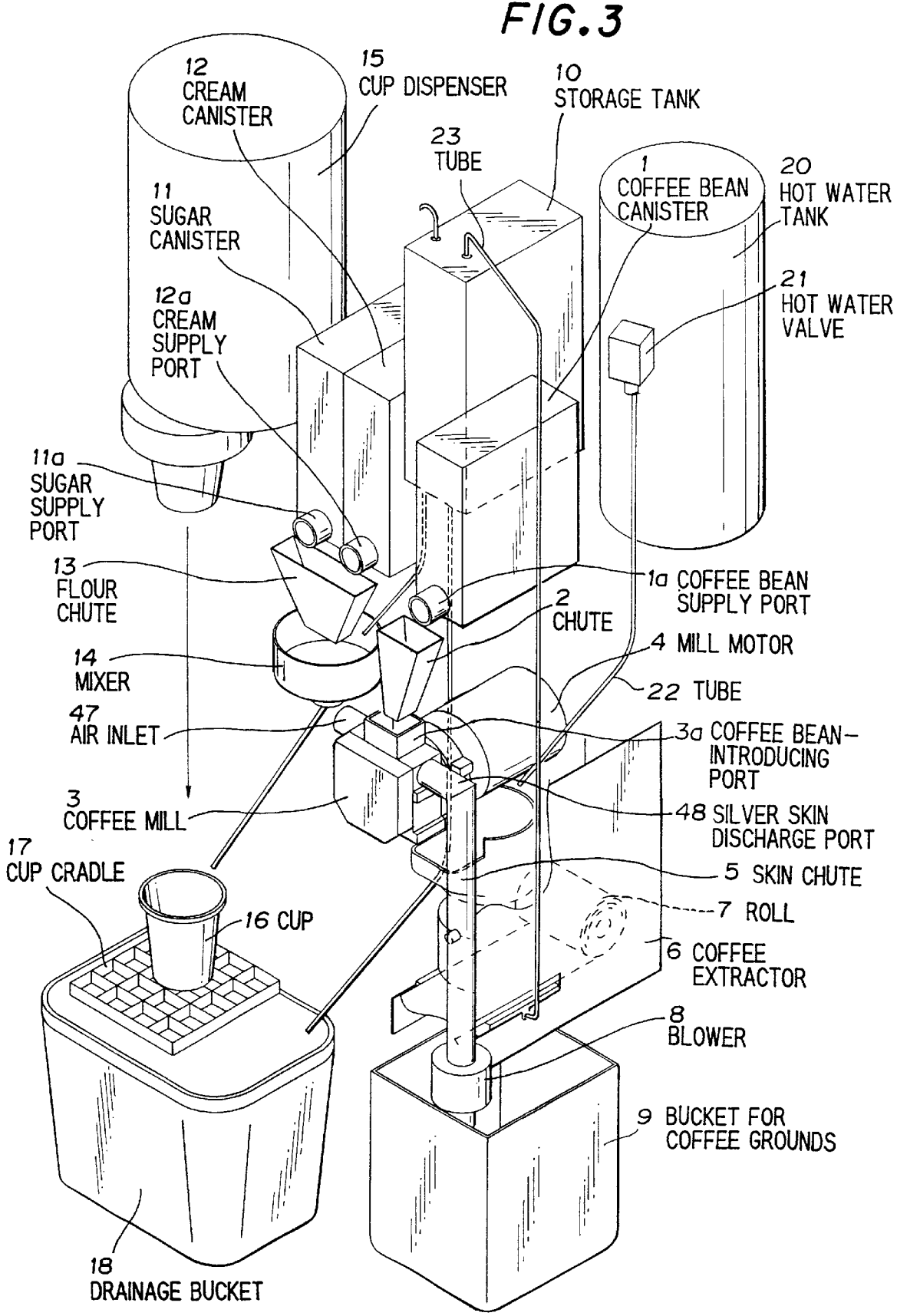
FIG. 3 is a perspective view showing an apparatus for preparing a coffee beverage in the first preferred embodiment of the present invention.

FIG. 3 shows the first preferred embodiment of the apparatus for preparing a coffee beverage according to the present invention. The same components in FIG. 3 as those shown in FIG. 1 are shown by the same numerals, so that the overlapped descriptions will be omitted. However, the first preferred embodiment of the present invention differs from the conventional coffee beverage-preparing apparatus shown in FIG. 1 with respect to providing the silver skin-removing section having an air inlet 47 and a silver skin discharge port 48 onto the coffee mill 3 (refer to FIGS. 4–6), connecting a skin chute 5 to the silver skin discharge port 48 and providing a blower 8 onto the skin chute 5.

Figure 4:
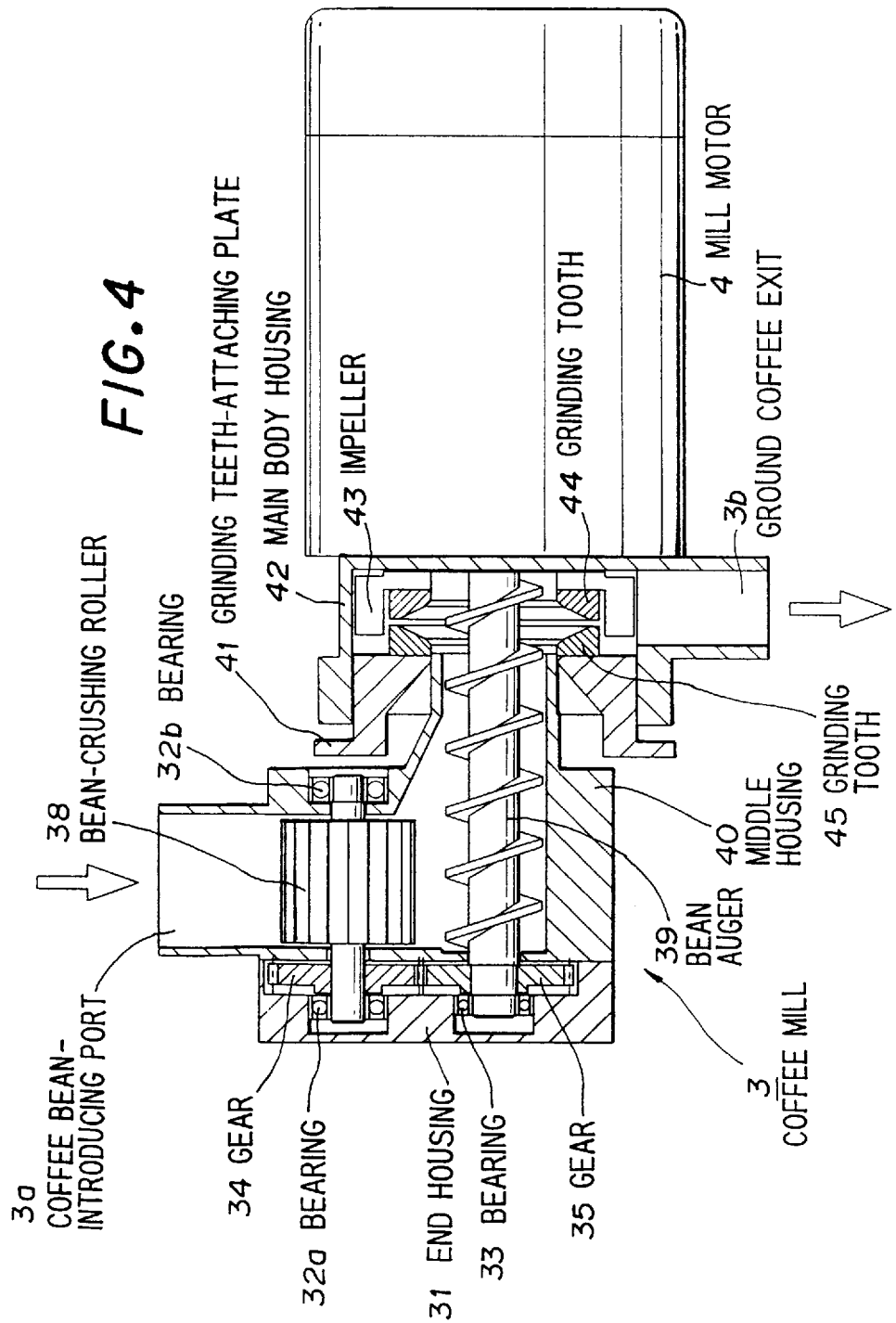
FIG. 4 is a sectional view showing the coffee mill in the first preferred embodiment shown in FIG. 3.

FIG. 4 shows the coffee mill 3 having the silver skin-removing section. The coffee mill 3 comprises the main body housing 42, the middle housing 40 and the end housing 31, and a grinding teeth-attaching plate 41 is disposed between the main body housing 42 and the middle housing 40. The end housing 31 has bearings 32a, 33 and 36 (refer to FIG. 5) accommodated therein, and the middle housing 40 has bearings 32b accommodated therein. Gears 34, 35 and 37 (refer to FIG. 5) are fixed to the shafts supported by these bearings 32a and 32b, 33 and 36, respectively. The shaft supported by bearings 33 is driven by a mill motor 4 and has a bean auger 39 fixed thereto in such a way that the bean auger 39 is rotated. To the shafts supported by the bearings 32a and 32b, and the bearing 36 are fixed a pair of coffee bean-crushing rollers 38 and 46 (refer to FIG. 6), respectively. The grinding teeth-attaching plate 41 has grinding tooth 45 attached, and the tooth 44 opposite to the tooth 45 is fixed to the bean auger 39 in such a way that the tooth 44 is rotated integrally with the bean auger 39. The grinding teeth 44 and 45 opposes each other in such a way that they form the space narrowing towards the periphery thereof. Sharp projections (not shown) are provided on the opposing faces forming this space. The bean auger 39 is integrated with an impeller 43 in such a way that the impeller 43 to exit the ground beans is rotated. The middle housing 40 has a bean-introducing port 3a on the upper portion and the main body housing 42 has a ground bean exit 3b.

Figure 5:
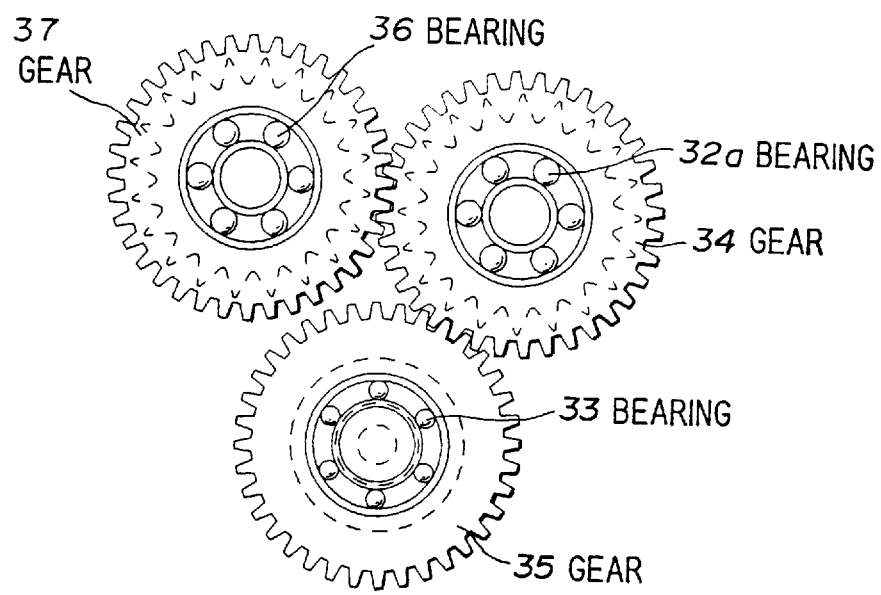
FIG. 5 is an explanation view showing a gear train of the coffee mill in the first preferred embodiment shown in FIG. 3.

FIG. 5 shows the bearings 32a, 33 and 36, and the gears 34, 35 and 37. The gear 35 rotated by the mill motor 4 is engaged with the gear 34, and the gear 34 is engaged with the gear 37.

Figure 6:
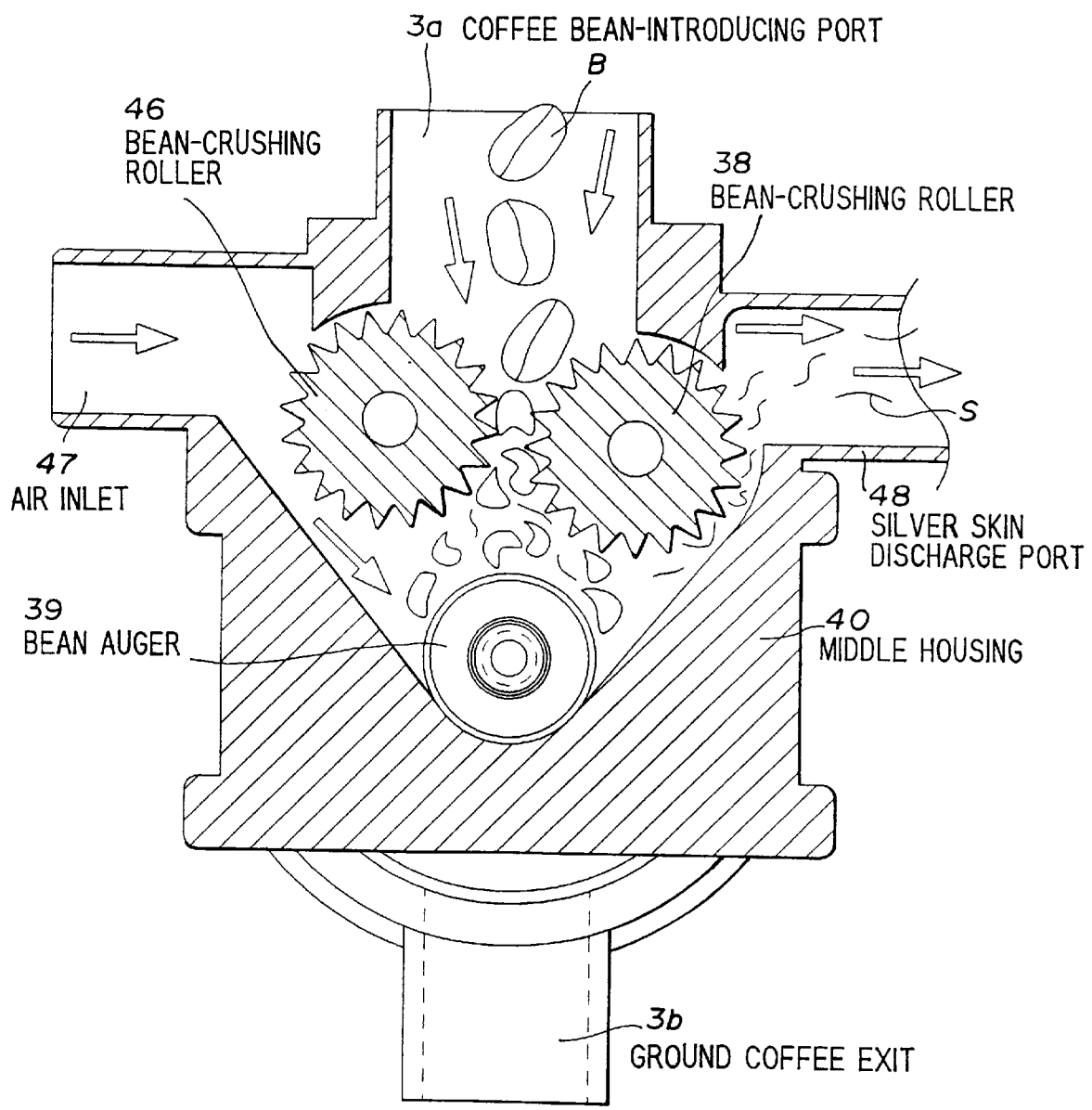
FIG. 6 is a sectional view showing the coffee mill in the first preferred embodiment shown in FIG. 3.

FIG. 6 shows the relative positional relationships among the bean auger 39, the bean-crushing rollers 38 and 46. The coffee beans B supplied from the coffee bean-introducing port 3a are dropped into the clearance between the bean-crushing rollers 38 and 46, and the resulting crushed beans are dropped on the bean auger 39. The middle housing 40 has the air inlet 47 communicating with the space to accommodate the bean-crushing roller 38 and 46 and the bean auger 39, and the silver skin discharge port 48 is connected to the skin chute 5.

Figure 7:
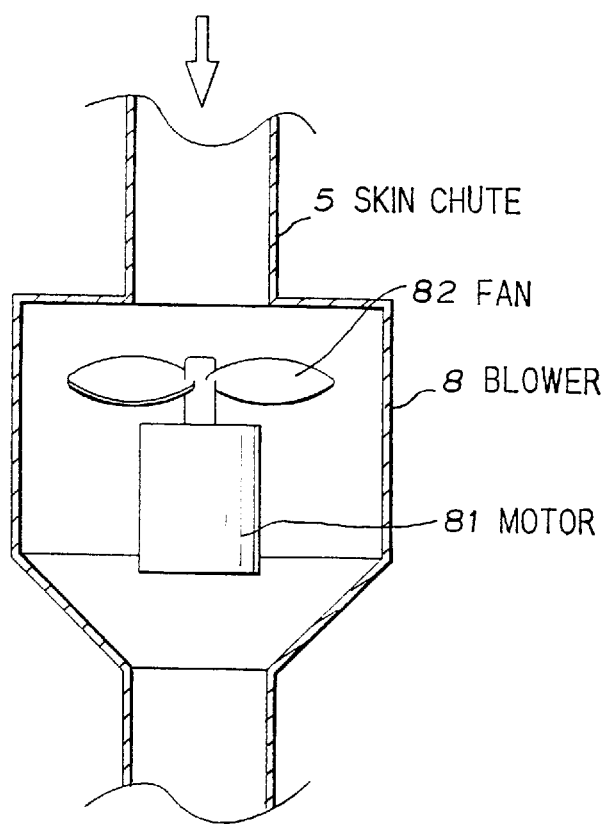
FIG. 7 is a sectional view showing a skin chute in the first preferred embodiment shown in FIG. 3.

FIG. 7 shows the blower 8 mounted onto the skin chute 5. The blower 8 has a motor 81 and a fan 82 rotated by the motor 81.

In operation of the coffee beverage-preparing apparatus in the first preferred embodiment described above, it is assumed that the storage tank 10 has no coffee beverage and the vending of a sugar-contained coffee beverage is demanded. When such a vending is demanded, the cup 16 is dispensed onto the cup cradle 17 from the cup dispenser 15, and about 10 g of coffee beans is dispensed from the roasted coffee bean canister 1. The dispensed coffee beans are entered into the coffee mill 3 through the chute 2 and the introducing port 3a. The mill motor 4 starts the rotation simultaneously with such a coffee vending demand, thereby coarsely crushing the coffee beans by the bean-crushing rollers 38 and 46. The bean auger 39 feeds the coarsely crushed coffee beans toward the grinding teeth 44 and 45.

When the coffee beans coarsely crushed by the bean-crushing roller 38 and 46 fall into the bean auger 39, air flow is drawn from the air inlet 47 and the coffee beans-introducing port 3a by rotation of the fan 82 of the blower 8 to generate the air flow shown by the arrows in FIG. 6. Since silver skin pieces S are very light, they are carried on this air flow and are sent through the skin chute 5 to the bucket for the coffee grounds 9 thereby resulting in the removal of the silver skins S. The amount of silver skins to be removed can be controlled by intensifying or reducing the air flow with operation of the motor-fan 82. The relation between the operation of the motor-fan 82 and the amount of removed silver skins can be determined experimentally.

The silver skin-removed ground coffee beans are moved towards the grinding teeth 44 and 45 by the coffee bean auger 39. The grinding tooth 44 against to the grinding tooth 45 is rotated together with the bean auger 39. When the coffee beans are fed into the space in which the grinding teeth 44 and 45 are rotated relatively, the coffee beans are ground to the grain size corresponding to the clearance between the installed grinding teeth 44 and 45 and the ground coffee beans are passed through the space between grinding teeth 44 and 45 by the air flow produced with rotation of the grinding tooth 44 and the rotation of the impeller 43 to be sent out to the ground coffee bean discharge port 3b. The supply of a required amount of hot water through the valve 21 of the hot water tank 20 is matched to the supply timing of the ground coffee beans from the coffee mill 3. In this way the ground coffee beans and hot water are supplied to the coffee extractor 6.

The coffee beverage prepared by the coffee extractor 6 is supplied from the tube 23 through the storage tank 10 into the mixer 14, a required amount of sugar (usually about 6–8 g per cup) is dispensed into the mixer 14 to prepare a sugar-contained coffee beverage for pouring it into the cup 16.

FIG. 8 shows the second preferred embodiment of the apparatus for preparing a coffee beverage according to the present invention. The same components in FIG. 8 as those shown in FIG. 3 are shown by the same numerals, so that the overlapped descriptions will be omitted. However, this apparatus differs from the apparatus shown in FIG. 3 in providing a ground coffee bean canister 25 is mounted under the coffee mill 3. The ground coffee bean canister 25 has an air inlet 47 having a blower 8 mounted therein, and a ground coffee bean dispenser 25a.

FIG. 9 shows a coffee mill 3 and a ground coffee bean canister 25. The same components in FIG. 9 as those shown in FIG. 4 are shown by the same numerals, so that the overlapped descriptions will be omitted. In this preferred embodiment, the coffee mill 3 has no coffee bean-crushing roller, and the ground coffee bean canister 25 has a ground coffee bean discharge port 3b. The ground coffee bean canister 25 has an air inlet 47 having a blower 8 mounted at the one end and a silver skin discharge port 48 connected to a skin chute 5 at the other end, and a flour auger 27 driven by an auger motor 26 and a ground coffee bean-dispensing port 25a to dispense the ground coffee beans fed out with the flour auger 27 to a coffee extractor 7 mounted on the lower part, respectively.

In operation of the apparatus for preparing a coffee beverage in the second preferred embodiment described above, the coffee beans dispensed from the canister 1 are fed through the coffee bean-introducing port 3a of the coffee mill 3 into the clearance between the grinding teeth 44 and 45 with the rotation of the bean auger 39 to be ground. The ground coffee beans are fed through the ground bean discharge port 3b into the ground coffee bean canister 25. At this time, the motor 81 and the fan 82 of the blower 8 are rotated to generate the air flow shown by the arrow. This air flow acts on the mixture of the ground coffee beans and the silver skins S thereby putting the lighter silver skins S on the air flow and permitting the heavier ground coffee beans to drop just under the ground bean discharge port 3b for storing them. The silver skins S are fed from the silver skin discharge port 48 through the skin chute 5 into the bucket 9 for the coffee grounds.

When the vending or reserving of a coffee beverage is demanded, a required amount of the ground coffee beans are dispensed from the ground coffee bean canister 25 into the coffee extractor 7 and a required amount of coffee beverage is prepared in the same manner as that in the first preferred embodiment.

Figure 10A:
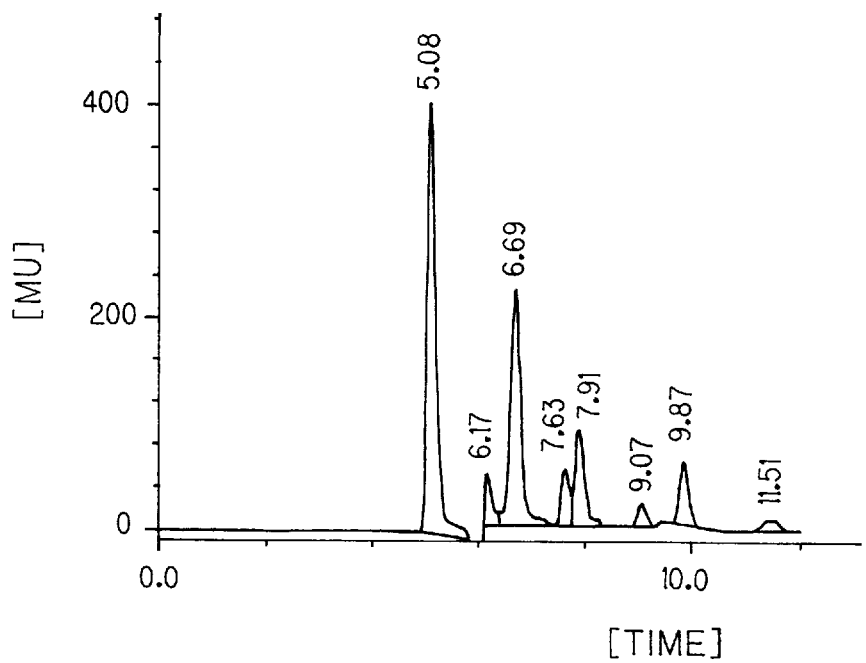
FIGS. 10A and 10B are the results of analysis for the astringency of the resulting present inventive and conventional coffee beverages, respectively.
Figure 10B:
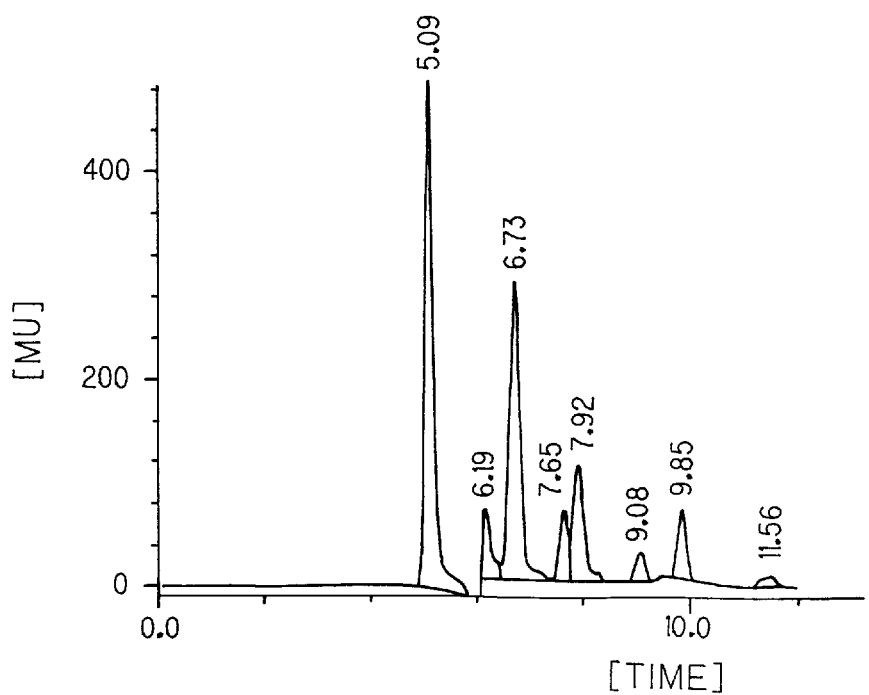

FIGS. 10A and 10B show the analyzed results of a group of organic acids contained in the coffee beverage using a liquid chromatograph, wherein FIG. 10A shows a analyzed result of the silver skin-removed coffee beverage and FIG. 10B shows analyzed result of the silver skin-unremoved coffee beverage.

In accordance with the analytical data of known samples (coffee beverages), it has been confirmed that a content having the peaks detected at the times of 5.07 to 5.09 presents astringency. That is, in the analysis using the liquid chromatograph, times at which peaks are detected are different by kinds of organic acids. Therefore, it can be judged in FIG. 10A that the organic acid having a peak at the time of 5.08 presents the astringency.

Comparing the magnitudes of peaks in the both samples, the silver skin-removed coffee beverage shown in FIG. 10A has a value of 410 and the silver skin-unremoved coffee beverage shown in FIG. 10B has a value of 490. From this result, it is proved that the astringency decreases by removing the silver skins of coffee beans.

Next, the analytical data determined by a taste sensor to detect the amount of changes in membrane potential will be shown.

The following samples (a), (b) and (c) are prepared for this analysis:
(a) a standard sample (prepared by grinding the coffee beans on the market);
(b) a silver skin-lessened sample (the silver skins are removed from the sample (a)); and
(c) a silver skin rich sample (the silver skins are added to the sample (a)).

From these samples the following results were obtained:

sample (c) (1.7)>sample (a) (1)>sample (b) (0.7)

The values in the above parentheses indicate the ratio in intensity of astringency. The two kinds of test data described above support the sensory taste test results.

As described above, the apparatus for preparing a coffee beverage according to the present invention can reduce its astringency because the coffee beverage is prepared from the silver skin-removed coffee beans. Therefore, a strong coffee beverage can be obtained without increasing an amount of the coffee beans used. Simultaneously, a miscellaneous taste-reduced high quality coffee beverage can be obtained.

Although the present invention has been described with respect to specific embodiments for complete and clear disclosure, the appended claims are not to be thus limited but are to be construed as embodying all modification and alternative constructions that may occur to those skilled in the art which fairly fall within the basic teaching herein set forth.

What is claimed is:

1. An apparatus for preparing a coffee beverage, comprising:
   a coffee mill for grinding coffee beans to provide the ground coffee beans, said coffee mill having a pair of coffee bean-crushing rollers for crushing the coffee beans coarsely in the clearance between said rollers, a pair of grinding teeth for grinding said coarsely crushed coffee beans to provide finely ground coffee beans, and a common motor to drive both said crushing rollers and said grinding teeth;
   an extractor arranged to receive the ground coffee beans from said coffee mill for extracting a coffee beverage out of the around coffee beans; and
   means for removing silver skins out of said coffee beans when said coffee beans are ground, said means for removing silver skins being arranged to remove said silver skins by directing an air flow to said coarsely crushed coffee beans to put said silver skins on the air flow thereby removing said silver skins out of said coarsely crushed coffee beans.

2. An apparatus for preparing a coffee beverage, according to claim 1, wherein:

said means for removing said silver skins is connected to a bucket for accommodating the coffee grounds discharged from said extractor to discharge said silver skins into said bucket.

3. An apparatus for preparing a coffee beverage, according to claim 1, wherein:

said means for removing said silver skins controls a removing amount of said silver skins depending on a flow speed or flow rate of said air flow.

4. An apparatus for preparing a coffee beverage, comprising:

a coffee mill for grinding coffee beans to provide the ground coffee beans, said coffee mill having a pair of grinding teeth for grinding said coffee beans to provide finely ground coffee beans, and a ground coffee bean discharge port to drop said ground coffee beans downward, an extractor arranged to receive the ground coffee beans from said coffee mill for extracting a coffee beverage out of the around coffee beans; and means for removing silver skins out of said coffee beans when said coffee beans are ground, said means for removing silver skins being arranged to remove said silver skins by directing an air flow to said ground coffee beans dropped from said discharge port to put said silver skins on the air flow, thereby removing said silver skins out of said finely ground coffee beans.

5. An apparatus for preparing a coffee beverage, according to claim 4, wherein:

said means for removing said silver skins is connected to a bucket for accommodating the coffee grounds discharged from said extractor to discharge said silver skins into said bucket.

6. An apparatus for preparing a coffee beverage, according to claim 4, wherein:

said means for removing said silver skins controls a removing amount of said silver skins depending on a flow speed or flow rate of said air flow.

* * * * *